United States Patent
Yanagitani et al.

(10) Patent No.: US 6,200,918 B1
(45) Date of Patent: *Mar. 13, 2001

(54) CORROSION RESISTANT CERAMIC AND A PRODUCTION METHOD THEREOF

(75) Inventors: Takagimi Yanagitani; Hideki Yagi, both of Mitoyo-gun; Seiki Imagawa, Marugame; Hitoshi Kubo, Mitoyo-gun, all of (JP)

(73) Assignee: Konoshima Chemical Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/210,750

(22) Filed: Dec. 15, 1998

(30) Foreign Application Priority Data

Dec. 16, 1997 (JP) .................................................. 9-364105

(51) Int. Cl.⁷ ............................. C04B 35/50; H01J 17/16
(52) U.S. Cl. ........................ 501/152; 313/635; 313/636; 313/640
(58) Field of Search .................. 501/152, 153; 313/635, 636, 640

(56) References Cited

U.S. PATENT DOCUMENTS

| | | | |
|---|---|---|---|
| 4,180,477 | * | 12/1979 | Barnes .............................. 252/301.4 |
| 4,525,460 | * | 6/1985 | Petrosian et al. ....................... 501/86 |
| 4,727,283 | * | 2/1988 | van Kemenade et al. .......... 313/487 |
| 4,841,195 | * | 6/1989 | De With et al. ....................... 313/636 |
| 4,950,266 | * | 8/1990 | Sinofsky ................................... 606/2 |
| 5,038,353 | * | 8/1991 | Esterowitz et al. ..................... 372/41 |
| 5,123,026 | * | 6/1992 | Fan et al. ................................ 372/75 |
| 5,280,492 | * | 1/1994 | Krupke et al. .......................... 372/41 |
| 5,289,482 | * | 2/1994 | Esterowitz et al. ..................... 372/41 |
| 5,420,878 | * | 5/1995 | Kane et al. .............................. 372/41 |
| 5,640,408 | * | 6/1997 | Joni et al. ............................... 372/41 |
| 5,742,632 | * | 4/1998 | Barnes et al. ........................... 372/68 |

FOREIGN PATENT DOCUMENTS

| | | | |
|---|---|---|---|
| 7-237983 | * | 12/1995 | (JP) . |
| 10-45467 | * | 2/1998 | (JP) . |
| 410294520 | * | 11/1998 | (JP) . |

* cited by examiner

Primary Examiner—Paul Marcantoni
(74) Attorney, Agent, or Firm—Arent Fox Kintner Plotkin & Kahn, PLLC

(57) ABSTRACT

A TAG, LAG or YbAG anti-corrosion layer of which Si content is 100 ppm or under and total content of Ca and Mg is 200 ppm or under is provided on the internal surface of a tubular YAG base of a discharge envelope. The mean particle size of the anti-corrosion layer is 20 μm or over, and the mean particle size of the base is 15 μm or under.

11 Claims, 5 Drawing Sheets

CORROSION RESISTANT CERAMIC AND A PRODUCTION METHOD THEREOF

FIELD OF THE INVENTION

The present invention relates to a corrosion resistant ceramic and, in particular, a translucent ceramic suitable to high pressure discharge lamps such as metal halide lamp.

PRIOR ART

High pressure discharge lamps such as high pressure mercury lamp and high pressure sodium lamp are used in outdoor lighting for road, stadium, etc., in general-purpose lighting for shops, and as light sources of head lamps of vehicles, overhead projector, liquid crystal projector, etc. Presently, metal halide lamps are attracting much attention, that have a higher radiant efficiency and better color rendering properties than high pressure mercury lamp and high pressure sodium lamp.

In a metal halide lamp, a metal halide such as NaI, CsI or HgI2 is sealed into a discharge envelope or arc tube. A high voltage is applied between electrodes of the lamp to make electric discharges and, in turn, thermally evaporate the metal halide. The metal halide is dissociated into a metal and a halogen, and the metal emits its specific light. As for luminescent materials, halides of rare earth elements have a higher radiation efficiency than halides of Na, Hg, etc. Thus switchover from halides of Na, Hg, etc. to halides of rare earth elements is under consideration.

As for the discharge envelope materials, vitreous silica (SiO2) and translucent alumina (Al2O3) are used. Vitreous silica, however, is less corrosion resistant, and its heat resistance is not sufficient. Translucent alumina is better in heat resistance and corrosion resistance than vitreous silica, but its crystal system is hexagonal and its straight light transmittance is as low as 10% to 20% approximately.

Yttrium aluminum garnet (Y3Al15O12: YAG) has been proposed as a material for discharge envelope (for example, Japanese Provisional Patent Sho 59-207555). YAG has a cubic system and has a theoretical transmittance as high as 80% or over, and its mechanical strength and heat resistance are comparable to those of translucent alumina.

YAG, however, tends to react with halides of rare earth elements and is poor in chemical corrosion resistance. For example, YAG is stable against halides of Li, Na, Hg, Cs, Tl, etc., but it reacts with halides of rare earth elements. With the accumulation of lighting hours, the discharge envelop gets whitely turbid and the lamp properties deteriorate. This reaction of getting whitely turbid inside the discharge envelope is considered to advance with the following mechanism:

(M'-X)(g)+(M"-O)(s)⊖(M'-O)(s)+(M"-X)(g)

where (g) represents a gas, (s) a solid, X a halogen element, M' and M" rare earth elements, respectively. Under high temperature, the luminescent material being a metal halide (M'-X)(g) is dissociated into M'(g) and X(g), and the dissociated M'(g) snatches the oxygen element from the oxide ceramic (M"-O)(s) and a resulting (M'-O)(s) adheres to the internal wall of the discharge envelope. As a result, the discharge envelope gets whitely turbid.

To avoid the above-mentioned reaction of getting whitely turbid, it is conceivable to raise the filling pressure of a Hg gas, etc. to suppress the contact between the metal atoms dissociated from the metal halide and the envelope material, or to evenly heat the discharge envelope to make the halogen cycle smoother. However, the discharge envelop tends to rupture if the sealing pressure is raised or the envelope is heated up.

The related prior art includes Japanese Provisional Patent Hei 7-237983. It has proposed to provide an anti-corrosion layer of an oxide of rare earth elements on the internal surface of a translucent alumina discharge envelope. This anti-corrosion layer, however, react with a base. If the high pressure discharge lamp is used at 1000° C. or over, the anti-corrosion layer gradually reacts with a base to crystalize and form an opaque layer. Moreover, due to thermal fatigue resulting from turning on and off of the lamp, the anti-corrosion layer gradually peals off from a base differing in crystal structure, lattice constants, coefficient of thermal expansion, etc. Japanese Provisional Patent Hei 10-45467 has proposed to use YAG for a corrosion resistant vessel of a dry etching machine.

Terminology

In the present specification, ppm and % are weight ppm and weight % if not specified otherwise. Ca and Mg are substantially even to each other, and their quantities are indicated in principle as a total content of Ca and Mg. When a content of Ca, Mg or Si is set at 200 ppm or under or at 100 ppm or under, O is included, and the mean particle size does not include O. Corrosion resistance means corrosion resistance against a halide of rare earth elements in a metal halide lamp when the lamp is turned on, and corrosion resistance means no occurrence of getting whitely turbid.

SUMMARY OF THE INVENTION

One objective of the present invention is to provide a corrosion resistant ceramic having a high strength and an excellent corrosion resistance, in particular, to provide a translucent ceramic that does not get whitely turbid even if it is used for a discharge envelop using a halide of rare earth elements.

A secondary objective of the present invention is to form a high pressure discharge lamp in an inexpensive manner and to eliminate the needs of mirror-plane-polishing the interior surface of a high pressure discharge lamp.

In the corrosion resistant rare earth element aluminum garnet ceramic of the invention, the total content of Tm, Yb and Lu in the constituent rare earth elements is from 10 to 100 mol %, and in said ceramic, the content of Si is from 0 to 100 wt ppm in metal reduction, and the total content of Ca and Mg is from 0 to 200 wt ppm in metal reduction. Under these conditions, corrosion resistance of the ceramic is improved significantly, and the ceramic does not get whitely turbid even if it is used as a discharge envelope of a high pressure discharge lamp using a halide of rare earth elements over a long time. A constituent rare earth element other than Tm, Yb and Lu is, for example, Y.

Preferably, the total content in said constituent rare earth elements of Tm, Yb and Lu is from 10 to 50 mol %. Under this condition, the corrosion resistance of the ceramic can be increased while reducing the quantities of Tm, Yb and Lu used.

Preferably, said corrosion resistant ceramic is translucent and is an envelope for a high pressure discharge lamp.

Preferably, the mean particle size of said corrosion resistant ceramic is from 1 to 20 μm, and more preferably, from 1 to 15 μm, and most preferably, from 1 to 10 μm. Under these conditions, a high straight light transmittance is obtained, and the mean three-points bending strength can be 400 MPa or over, and Weibull coefficient can be 6 or over.

Preferably, the mean three-point bending strength of said corrosion resistant ceramic is 400 MPa or over and its Weibull coefficient is 6 or over. Under these conditions, a high resistance to thermal fatigue is obtained.

In a corrosion resistant ceramic according to the present invention, at least one face of a base being a rare earth element aluminum garnet ceramic is provided with a rare earth element aluminum garnet anti-corrosion layer wherein the constituent rare earth element is at least one of Tm, Yb and Lu, the Si content is from 0 to 100 wt ppm in metal reduction and the total content of Ca and Mg is from 0 to 200 wt ppm in metal reduction. Under this condition, the base can be constituted of inexpensive YAG, etc. and an anti-corrosion layer having excellent corrosion resistance can be obtained.

Preferably, said base is tubular, both said anti-corrosion layer and said base are translucent, said anti-corrosion layer is provided on the internal surface of said base, and the corrosion resistant ceramic is used as a discharge envelope for a high pressure discharge lamp.

Preferably, the Si content of said base is 4 ppm or under, its total content of Ca and mg is from 5 to 1000 wt ppm, and its mean particle size is from 1 to 15 $\mu$m.

Preferably, the mean three-points bending strength of said base is 400 MPa or over and its Weibull coefficient is 6 or over.

Preferably, the mean particle size of said anti-corrosion layer is 20 $\mu$m or over, and its Si content is from 0 to 60 wt ppm in metal reduction, and the total content of Ca and Mg is from 0 to 100 wt ppm in metal reduction.

Preferably, only the external surface of the base of said corrosion resistant ceramic is polished. When the mean particle size of the anti-corrosion layer is 20 $\mu$m or over, the optical transmittance is improved significantly, requiring no polishing of the internal surface of the discharge envelope. Thus it is sufficient to polish only the external surface of the base.

In the method of producing a corrosion resistant ceramic according to the present invention, on the internal surface of a non-sintered molding of a tubular base of a rare earth element aluminum garnet ceramic, a precursor layer of a rare earth element aluminum garnet anti-corrosion layer wherein the constituent rare earth element is at least one of Tm, Yb and Lu and the Si content should be from 0 to 100 wt ppm in metal reduction and the total content of Ca and Mg should be from 0 to 200 wt ppm in metal reduction is formed, and subsequently, said tubular base and said precursor layer are sintered.

Preferably, as for the non-sintered molding of said tubular base, the Si content should be 4 ppm or under in metal reduction (not more than the level of impurities) and the total content of Ca and Mg should be from 5 to 1000 wt ppm in metal reduction.

Rare earth element aluminum garnet ceramics are expressed by a general formula $Ln_3Al_5O_{12}$ where Ln is one of lanthanoids including yttrium, and it is Y when the rare earth element is not clearly indicated, and for example, the balance of Tm, Yb and Lu of rare earth elements should be Y, and the rare earth element of the base is, for example, Y.

Tm, Yb and Lu are even to each other, and the total content of these elements matters, but inexpensive Yb is particularly desirable. Ca and Mg are even to each other and the their total content matters.

The corrosion resistant ceramic of the present invention is also applicable to other uses than discharge envelopes by taking the advantage of its excellent corrosion resistance against halogen, etc.

The present inventor has found that when a constituent rare earth element is at least one of Tm, Yb and Lu, the reactivity with halides of rare earth elements decreases extremely and the ceramic does not get whitely turbid. However, this relates to the content of Ca and Mg and the content of Si, and for example, as shown in FIG. 9, when the total content of Ca and Mg exceeds 200 ppm, the corrosion resistance of the ceramic drops and the ceramic gets whitely turbid. Similarly, when the content of Si exceeds 100 ppm, the ceramic gets whitely turbid. Preferably, the total content of Ca and Mg is not more than 100 ppm and the content of Si is not more than 60 ppm. A translucent ceramic of which constituent rare earth element is at least one of Tm, Yb and Lu, total content of Ca and Mg is 200 ppm or under and content of Si is 100 ppm or under does not get whitely turbid against luminescent materials of virtually all rare earth element halides.

If the Si content exceeds 100 ppm or the total content of Ca and Mg exceeds 200 ppm, $Tm_3Al_5O_{12}$ (TAG) gets whitely turbid with halides of Sc and Er, $Ul_3Al_5O_{12}$ (LAG) gets whitely turbid with halides of Sc, Ho, Er and Tm, and $Yb_3Al_5O_{12}$ (YbAG) gets whitely turbid with halides of Sc, Dy, Ho, Er, Tm and Lu, respectively.

In rare earth element aluminum garnet, even when raw materials of high purity are used, the content of Ca as an impurity is from 1 to 4 ppm approx., the content of Mg as an impurity is 1 ppm or under, and the content of Si as an impurity is from 1 to 4 ppm approx. Accordingly, when Ca or Mg is added, the meaningful minimum addition is 5 ppm. As other impurities such as alkali metals can be removed easily, problems of impurities are limited to Ca, Mg and Si.

Tm, Yb and Lu are expensive elements, and as shown in FIG. 8, when their total content exceeds 10 mol %, the corrosion resistance increases dramatically. Accordingly, when these elements are to be contained in the entire ceramic, preferably, the total content of Tm, Yb and Lu is from 10 to 50 mol %. Even in this case, the ceramic tended to get whitely turbid when the content of Si exceeded 100 wt ppm in metal reduction or the total content of Ca and Mg exceeded 200 wt ppm in metal reduction.

The present inventor has succeeded in reducing the usages of Tm, Lu and Yb by using them as a translucent ceramic anti-corrosion layer. A rare earth element aluminum garnet anti-corrosion layer of which constituent rare earth element is at least one of Tm, Yb and Lu was formed on the internal surface of the base of a translucent discharge envelope of YAG, holmium aluminum garnet (HAG), erbium aluminum garnet (EAG), dysprosium aluminum garnet (DyAG), etc. Resulted lamp characteristics were stable over a long time (stability over several thousands to 10,000 hours), and the straight light transmittance was high and the lamps hardly got whitely turbid. Of these bases, YAG is an inexpensive standard material, and EAG, HAG and DyAG show absorption specific to their rare earth elements in the visible range and produce colored discharge lamps.

The anti-corrosion layer that is provided on the internal surface of the base may be either a thin film (film thickness is less than 1 $\mu$m) or a thick film (film thickness is 1 $\mu$m or over). The corrosion resistance does not differ whether it is a thin film or a thick film. A thin film, however, can not bear mirror-plane-polishing of the internal surface. Hence the internal surface is mirror-plane-polished, for example, after sintering the base before forming the anti-corrosion layer. Or the anti-corrosion layer is provided as a thick film and sintered under a condition of suppressing the grain growth of the base; preferably, the mean particle size of the base is 15 µm or under, more preferably, 10 µm or under, and much more preferably, from 1 to 10 µm, and to eliminate the need of polishing the anti-corrosion layer, preferably, the mean particle size of the anti-corrosion layer is 20 µm or over, more preferably, 20 µm or over and not more than the film thickness of the anti-corrosion layer, and most preferably, 30 µm or over and not more than the film thickness of the anti-corrosion layer (FIG. 3 and FIG. 4).

The mean particle size of a translucent ceramic has a substantial effect on its strength when it is used in a high pressure discharge lamp. Accordingly, as for the base of a translucent ceramic, preferably, the mean particle size is 15 µm or under, and much more preferably, not more than 10 µm and not less than 1 µm. When the mean particle size is 15 µm or under, the mean three-points bending strength is 400 MPa or over and Weibull coefficient is 6 or over, and under these conditions, the translucent ceramic exhibits a sufficient strength for a high pressure discharge lamp (FIG. 5). When the mean particle size is not more than 10 µm and not less than 1 µm, these conditions of mean three-points bending strength and Weibull coefficient can be met more reliably.

The mean particle size of the base portion of a translucent ceramic is highly susceptible to the influences of Si, Ca and Mg; Si promotes grain growth, and Ca and Mg suppress grain growth (FIG. 1). Hence the total content of Ca and Mg matters. To keep the mean particle size at 15 µm or under, it is desirable that the total content of Ca and Mg is equal to or more than the content of Si in mole ratio and the total content of Ca and Mg is from 5 to 1000 wt ppm. Preferably, the total content of Ca and Mg is 600 ppm or under, more preferably, 100 ppm or under, and most preferably, 60 ppm or under. As for the content of Si, the smaller, the better. In terms of mole ratio, the content of Si is not more than the total content of Ca and Mg. Preferably, the content of Si is 100 ppm or under, more preferably, 60 ppm or under, and most preferably, 4 ppm or under.

In this way, grain growth of a base can be suppressed to obtain a combination of a base having a small mean particle size and an anti-corrosion layer having a large mean particle size. The difference in mean particle size between the base and the anti-corrosion layer can be generated by addition of Ca and/or Mg to the base as well as addition of Si to the anti-corrosion layer. As for the contents of Ca, Mg and Si in a base and an anti-corrosion layer before sintering, values that are converted into those after sintering are indicated. However, as losses of Ca, Mg and Si are small in the sintering process, their contents before sintering may be considered to be equal to their contents after sintering.

In the present invention, both the anti-corrosion layer and the base are of the same kind of crystal structure and their lattice constants and coefficients of thermal expansion are similar to each other. Hence the anti-corrosion layer and the base adhere to each other closely, and peeling off of the anti-corrosion layer due to thermal fatigue does not occur. Moreover, as the anti-corrosion layer itself is a translucent ceramic, the formation of the layer does not lower the transmittance.

A method of forming, at the time of molding a translucent base, a layer that becomes an anti-corrosion layer after sintering will be described. The raw material powders for a translucent base and for forming a layer may be prepared by mixing fine powders of oxides of rare earth elements and aluminum into a garnet composition. From the viewpoint of homogeneity, it is desirable to use a single phase of garnet. A raw material powder of a single phase of garnet can be obtained by a method that uses, for example, ammonium hydrogencarbonate as a precipitant. The base is formed from a raw material powder by press molding, slip casting, extrusion, injection molding, etc.

For example, 20 to 100 weight parts of a liquid medium such as pure water, alcohol, etc., and for example 0.2 to 10 weight parts of a binder and for example 0.2 to 10 weight parts of a deflocculant are added to 100 parts of a raw material powder. They are mixed and dispersed in a ball mill, for example, for 10 or more hours to produce a slurry. When injection molding is used, no liquid medium is used. As for the binder, methyl cellulose, acrylic emulsion, polyvinyl alcohol, etc. may be used. As for the deflocculant, ammonium salt of polyacrylic acid, polycarboxylic acid, etc. may be used.

The prepared slurry is dried or condensed as required. When press molding is used, the slurry is dried by using a drier such as spray drier to obtain granule of the raw material powder. This granule is molded with a metal mold or a rubber mold having a desired configuration. When extrusion is used, the slurry is concentrated to a viscosity at which the slurry can be extruded, and the concentrated slurry is molded by an extruder. When slip casting is used, the slurry as it is is slip-cast into a gypsum mold, a porous resin mold, a porous ceramic mold, etc. to obtain a molding.

A slurry of rare earth element aluminum garnet for the anti-corrosion layer that has been prepared in advance is poured over the molding to form the layer. Thus the layer is formed by slip casting with the base molding serving as a mold. If the base molding is not porous due to solidification of the binder, etc., first, the base molding is cleaned. Then an operation similar to that mentioned above may be made. As will be described later, when the mean particle size of the anti-corrosion layer is made larger to improve the straight light transmittance, for example, the external surface is also coated with the anti-corrosion layer to eliminate the need of polishing of both the internal and external surfaces. In this case, the molding of the discharge envelope is dipped into the slurry for coating. If the garnet composition of the layer to be formed on the internal surface and that of the layer on the external surface differ from each other, both ends of the envelop molding are sealed to prevent the slurry for the external surface from entering into the inside of the envelope.

Preparation of the slurry for the ceramic layer may be done in a manner similar to that for the base. Preferably, the preparation is made in such a way that the behavior of shrinkage due to sintering and the shrinkage percentage after sintering of the ceramic layer are the same with those of the base. Control of the shrinkage percentage can be easily achieved by controlling the density, viscosity, particle size distribution, etc. of the slurry. The thickness of the ceramic layer can be controlled to be at any desired level by controlling the slurry holding time that is between the injection of the slurry and the drainage. When a thick layer is to be formed, preferably, a high density slurry having a high film forming velocity is used, and when a thin layer is to be formed, preferably, a low density layer having a low film forming velocity is used. When a more thinner layer is to be formed, the layer is formed after moistening the base molding with the liquid medium that is used in preparing the slurry for the layer.

The composite molding thus obtained is cleaned, then it is sintered in an atmosphere of oxygen, hydrogen or a rare gas, or a mixture of them, or in vacuum, at 1500° C. or over, or more preferably at 1600° C. or over, and at a temperature being lower by 50° C. or more than the melting point of the sintered compact for from one hour to 100 hours to obtain the translucent ceramic. Preferably, the sintering atmosphere is vacuum or hydrogen to obtain a ceramic of good transmittance in a short time. The sintering temperature is set at a temperature that is 1500° C. or over and is lower by 50° C. or over than the melting point of the sintered compact, and the reasons for this are that at a temperature below 1500° C. sufficient consolidation can not be generated, and in turn, a sufficient transparency can not be obtained, and that abnormal grain growth occurs near the melting point of the sintered compact, and in turn, the strength of the sintered compact drops conspicuously.

When both the internal surface and the external surface of a rare earth element aluminum garnet discharge envelope thus obtained as mentioned above are mirror-plane-polished with diamond slurry, alumina slurry, etc., a ceramic discharge envelope with an excellent straight light transmittance is obtained. Without mirror-plane-polishing the internal and external surfaces, it is possible to obtain a sintered compact of which straight light transmittance is 50% or over. Particularly, in fields other than using a discharge lamp as a point source (for example, a light source of a crystal liquid projector), the sintered compact may be used as a discharge tube without mirror-plane-polishing.

Generally speaking, the external surface of a translucent ceramic that has not been polished is semitransparent. This is because the grain boundaries of of particles of the sintered compact constituting the surface are eroded by heat of sintering and are depressed; thus light is scattered by the unevenness at the grain boundaries between particles. the smaller the particle size is, the greater the the degree of light scattering is. Conversely, the greater the particle size is, the smaller the degree of light scattering is. When the particle size is 20 $\mu$m or over, and preferably, the particle size is 30 $\mu$m or over, the effects of light scattering are reduced extremely. On the other hand, the greater the particle size is, the lower the strength of the sintered compact is. Conversely, the smaller the particle size is, the greater the strength of the sintered compact is. Preferably, the mean particle size of the base portion is 15 $\mu$m or under, and more preferably, 10 $\mu$m or under. When the mean particle size of the base is 15 $\mu$m or under, and preferably, 10 $\mu$m or under, and the mean particle size of the anti-corrosion layer is 20 $\mu$m or over, and preferably, 30 $\mu$m or over, a sufficient straight light transmittance can be obtained without mirror-plane-polishing the internal surface of a high pressure discharge lamp.

The discharge envelope of a high pressure discharge lamp is exposed to a high pressure of from several tens to 100 atm just when the lamp is turned on. To improve the pressure resistance of the discharge envelope so as to prevent it from bursting, it is necessary to reduce the size of particles constituting the ceramic. As for garnet ceramics for envelopes of high pressure discharge lamps, a mean three-points bending strength of 400 MPa or over and Weibull coefficient of 6 or over are needed. To produce such high-strength ceramics, in the case of translucent garnet ceramics, it is necessary to keep the mean particle size of the base at 15 $\mu$m or under. To change the mean particle size of the anti-corrosion layer and the mean particle size of the base as described above, Ca or Mg may be added to the base as a grain growth restrainer before high-temperature sintering. As the effects of Ca or Mg are diluted by Si, Ca and Mg of the same amount in mole ratio with Si or more is added, and the total addition of Ca and Mg is from 5 to 1000 wt ppm. When the total addition is less than 5 wt ppm, the addition has no effects, and when the addition is more than 1000 wt ppm, a second phase is generated to lower the light transmittance of the base.

Next, a method of sintering a translucent base in advance and then forming a translucent anti-corrosion layer on the internal surface of the base will be described.

The method of producing the translucent base is similar to the one mentioned above except the layer is not formed when the base is molded. First, at least the internal surface of the base is mirror-plane-polished, then a mixed metal salt solution for forming the layer that has been prepared in advance is applied to the internal surface of the base. A mixed metal salt solution may be, for example, a solution of alcoholates of rare earth elements and aluminum mixed into a garnet composition, organic high-molecular acid salts such as stearic acid salts dissolved in toluene, alcohol, etc., and acid anhydrides solubilized to alcohol by amine, etc. The applying method is not specified particularly. The simplest method is to seal one end of a discharge envelope, inject a mixed metal salt solution from the other end of the envelope with a syringe, etc., then release the sealed end to drain out the excessive metal salt solution. When this method is used, a coated layer of approximately 0.01 to 0.1 $\mu$m can be formed by a single cycle of these steps. The layer thickness can be increased more, but a thicker layer tends to crack during drying. Hence it is desirable to set the thickness of a single coat at 0.1 $\mu$m at the largest. To obtain a more thicker layer, the steps of applying, drying and heat-treating at 300~600° C. may be repeated.

After the formation of an applied layer in the above-mentioned manner, the layer is eventually heat-treated at 800~1500° C., and preferably, at 1100~1400° C. to obtain a desired rare earth element aluminum garnet anti-corrosion layer. When the heat treatment temperature is lower than 800° C., the crystallinity of the resulting layer is not sufficient. When the heat treatment temperature is 1600° C. or over, thermal etching of the base occurs to lower the transmittance. More preferably, the layer is treated at a temperature that is a little higher than the temperature of the discharge envelope when the lamp is on. With the steps described above, a ceramic discharge envelope that excels in straight light transmittance and suitable for metal halide lamp is obtained. When the outer circumference of the base has not been worked yet, the outer circumference is mirror-plane-polished. In the formation of an anti-corrosion layer according to this method, the layer does not singularly form grains. The anti-corrosion layer is considered to make epitaxial growth on the crystal grains of the base.

In the method of forming a layer that will become a film after sintering is formed when a translucent base is molded (molding before sintering), a thick film is mainly obtained, whereas in the method of forming a translucent base in advance and forming a translucent film on the internal surface of the base, a thin film is mainly obtained.

EMBODIMENT

Embodiment 1

Figure 1:
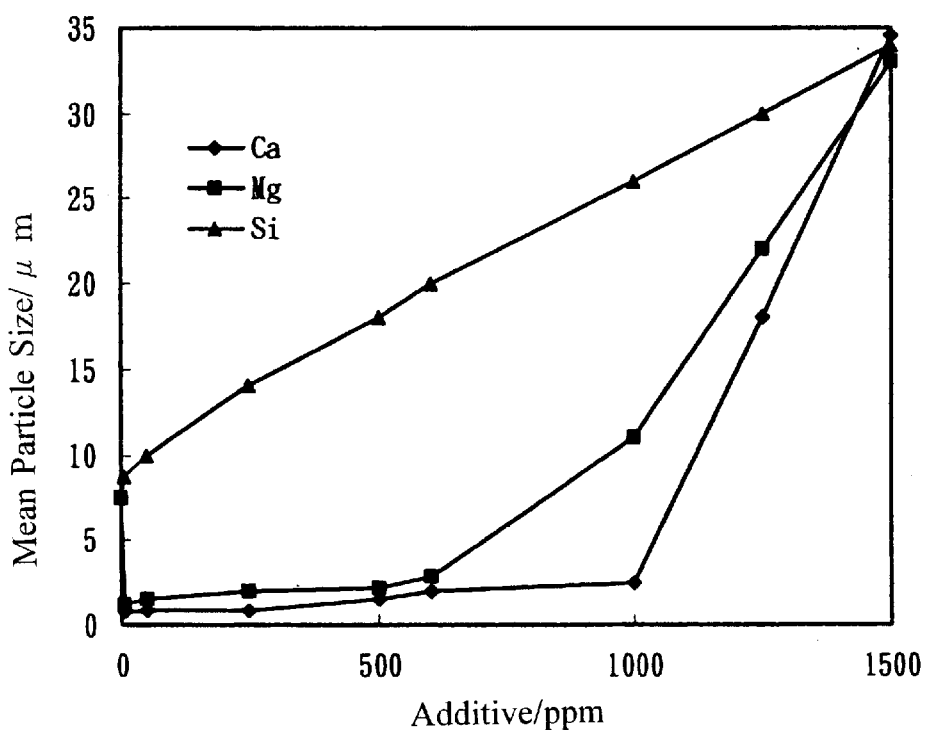
FIG. 1 is a characteristic diagram showing the effects of Ca, Mg and Si on the mean particle size of of YAG that was calcinated at 1300° C. and sintered in vacuum at 1680 ° C.

30 liters of an aqueous solution of ytterbium nitrate of 0.5 mole/liter and 50 liters of an aqueous solution of aluminum nitrate of 0.5 mole/liter was mixed together. This mixed aqueous solution was added dropwise, at a rate of 2.8 liters/minute, to 80 liters of an aqueous solution of ammonium hydrogencarbonate of 2 moles/liter adjusted to pH 8.0 by adding aqueous ammonia. During this dropping, the mixed aqueous solution of ytterbium nitrate and aluminum nitrate were maintained at 25° C. in a thermostat. After completion of dropping, aging was made at 25° C. for 24 hours. Then steps of filtration and rinsing with water were repeated four times. Then drying was made at 140° C. for 48 hours.

The amorphous precipitate thus obtained was calcinated at 1300° C. for 3 hours. As a result, fine powder of ytterbium aluminum garnet (YbAG) was obtained. It had an excellent dispersibility and the mean primary particle size was 0.2 μm. 60 g of a plasticizer Cerami-Zol C-08 (product of Nihon Yushi Co.) was added to 2 kg of this YbAG material powder. Then 300 g of methyl cellulose was added as a binder to the mixture. 4 kg of deionized water was added to the mixture, and the mixture was mixed in a ball mill using a nylon pot and nylon balls for 100 hours. The resulted slurry was heated to concentrate it to have an extrudable level of consistency. The body was passed through a three-roll mill to improve its homogeneity. The resulted body was formed by an extruder into a molding of 60 mm×200 mm×4 mm. The molding was sufficiently dried, then it was raised to 600° C. at a rate of 20° C./hour. The molding was kept at this temperature for 12 hours to degrease it. After that, it was sintered in vacuum kiln at 1680° C. for 5 hours. At the time, the rate of temperature rise was 300° C./hour, and the residual pressure was not higher than $10^{-3}$ Torr.

The sintered compact was mirror-plane-polished, on both surfaces, with diamond slurry. Then its straight light transmittance was measured with a spectrophotometer. As a result, the straight light transmittance at wavelength of 600 nm was 79.8% (specimen thickness: 1.0 mm). This specimen was subjected to thermal etching in atmosphere at 1500° C. for two hours. then its microstructure was observed under an optical microscope. The mean particle size was 6.2 μm. The mean particle size was obtained by Mean particle size=1.56 C/(MN)

where C is the length of a segment of a line freely drawn on a high resolution image of SEM, etc., N is the number of particles on this segment, and M is the magnification of the image.

Next, sintered compacts of Yb3Al5O12 were produced in a similar manner except the sintering temperature in vacuum was changed within a range of from 1470° C. to 1920° C. Moreover, sintered compacts of Yb3Al5O12 were produced in a similar manner except the sintering temperature was changed to 1700° C. or 1800° C. and the contents of Ca, Mg and Si were changed. These sintered compacts were subjected to three-points bending test according to JIS (Japanese Industrial Standard)-R1601. The bending test was given to 20 specimens, and Weibull chart (Japanese Standard Association) was used to determine Weibull coefficient. The bending strength is shown by mean three-points bending strength. In a similar manner, sintered compacts of Y3Al5O12 (YAG), TmAl5O12 (TAG) and Lu3Al5O12 (LAG) were produced and examined. The results are shown in Table 1. If not specifically indicated, Ca, Mg or Si were not added, and their contents were not more than 4 wt ppm, respectively. The straight light transmittance was measured after mirror-plane-polishing both surfaces of the sintered compact, and the specimen thickness was 1.0 mm. From these findings, it may be judged that, preferably, the mean particle size should be from 1 to 20 μm, more preferably, from 1 to 15 μm, and most preferably, from 1 to 10 μm. Furthermore, from Table 1, some preferable examples can be picked up. They are high pressure discharge lamp envelopes of Yb3Al5O12 wherein the total content of Ca and Mg is not more than 50 wt ppm, the Si content is not more than 5 wt ppm, the mean particle size is from 1 to 15 μm, and particularly, from 2 to 15 μm, Weibull coefficient is not less than 6, and the mean three-points bending strength is not less than 450 MPa.

TABLE 1

Physical Properties of Rare Earth Element Aluminum Garnet Sintered Compacts

| Material | Additive (wt ppm) | Sintering temp. (° C.) | MPS* (μm) | Straight light transmittance (%) | Bending strength (MPa) | Weibull coeffi. |
|---|---|---|---|---|---|---|
| Yb3Al5O12 | . . . | 1470 | 0.65 | 1 | 780 | 5 |
| Yb3Al5O12 | . . . | 1680 | 6.2 | 80 | 580 | 6 |
| Yb3Al5O12 | . . . | 1730 | 10.9 | 82 | 525 | 8 |
| Yb3Al5O12 | . . . | 1800 | 13.1 | 82 | 475 | 8 |
| Yb3Al5O12 | . . . | 1880 | 27.6 | 81 | 395 | 4 |

TABLE 1-continued

Physical Properties of Rare Earth Element Aluminum Garnet Sintered Compacts

| Material | Additive (wt ppm) | Sintering temp. (° C.) | MPS* ($\mu$m) | Straight light transmittance (%) | Bending strength (MPa) | Weibull coeffi. |
|---|---|---|---|---|---|---|
| Yb3Al5O12 | ... | 1920 | 45.2 | 80 | 300 | 4 |
| Yb3Al5O12 | Ca 50 | 1800 | 2.1 | 82 | 729 | 7 |
| Yb3Al5O12 | Si 75 | 1700 | 18.4 | 79 | 434 | 6 |
| Yb3Al5O12 | Si 100 | 1800 | 32.6 | 80 | 380 | 6 |
| Y3Al5O12 | ... | 1680 | 7.5 | 79 | 585 | 8 |
| Y3Al5O12 | ... | 1730 | 14.5 | 81 | 408 | 6 |
| Tm3Al5O12 | ... | 1680 | 7.1 | 72 | 565 | 6 |
| Tm3Al5O12 | ... | 1700 | 9.8 | 75 | 555 | 7 |
| Lu3Al5O12 | ... | 1680 | 5.9 | 73 | 630 | 7 |
| Lu3Al5O12 | ... | 1730 | 12.3 | 73 | 412 | 6 |
| Lu3Al5O12 | ... | 1800 | 18.9 | 75 | 351 | 5 |

*MPS: mean particle size.

Embodiment 2

Figure 2:
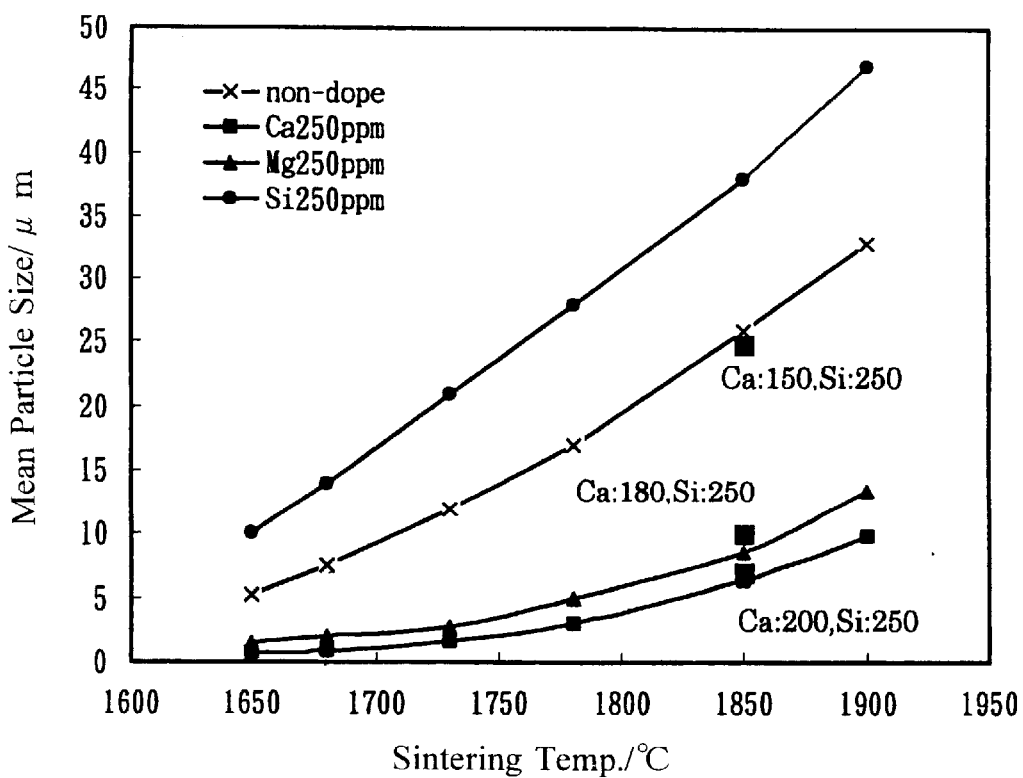
FIG. 2 is a characteristic diagram showing the effects of the sintering temperature in vacuum and the sintering additive on the mean particle size in YAG that was calcinated at 1300° C.

A flat plate (60 mm×100 mm×1 mm) of YAG was produced in a manner similar to Embodiment 1. Flat plates of YAG to which CaO, MgO or SiO2 were added as a sintering aid in the stage of mixing in a ball mill before concentrating were also produced. The relationship between the addition of the aids and the mean particle size of the sintered compact is shown in FIG. 1 for sintered compacts that were sintered at 1680° C. for 5 hours (aid addition: 0.5, 50, 250, 500, 600, 1000, 1250 and 1500 wt ppm). The relation between sintering temperature and mean particle size of sintered compacts when the aid addition was kept constant is shown in FIG. 2. The results show that SiO2 has a grain growth promoting effect, and Ca and Mg have a grain growth restraining effect. The effect of Ca and that of Mg are almost equivalent to each other, and they are effective in a range of from 5 to 1000 ppm, and more specifically in a range from 5 to 600 ppm. It is also found that when more Ca or Mg is added the grain growth starts. In FIG. 2, the results of addition of Ca to 250 ppm of Si are shown as well. The results show that Si acts to cancel the effects of Ca and Mg. Thus grain growth restraining effect can be expected only when a greater quantity of Ca or Mg than the quantity of Si in mole ratio is added.

Embodiment 3

In a manner similar to that of Embodiment 2, YAG to which 10 ppm of Ca was added was extruded. The molding was degreased at 600° C., and to achieve a handling strength, the molding was heated at 800° C. for 1 hour. The molding showed no shrinkage due to this treatment. This heat-treated molding was immersed in ultrapure water in a beaker, then the the molding was degassed in vacuum to make ultrapure water seep deep into the inside of the molding. Next, the heat-treated molding was taken out of ultrapure water, and water on its surface was lightly wiped off. Then the molding was immersed in a slurry for forming an LAG layer prepared in advance, and the molding was pulled out at a rate of 100 mm/minute. The molding was dried sufficiently, then in a manner similar to that of Embodiment 1, the molding was degreased and sintered. The slurry for forming an LAG layer was prepared as follows. 6 g of polycarboxylic acid ammonium salt as a deflocculation agent was added to 2 kg of LAG material powder prepared in a manner similar to Embodiment 1. Then 100 g of WA-320 (Toa Synthetic Chemicals) as a binder was added to the mixture. 2 kg of deionized water was added to the mixture, and the mixture was mixed in a ball mill using a nylon pot and nylon balls for 100 hours. The thickness of the anti-corrosion layer after sintering was 60 $\mu$m.

Figure 3:
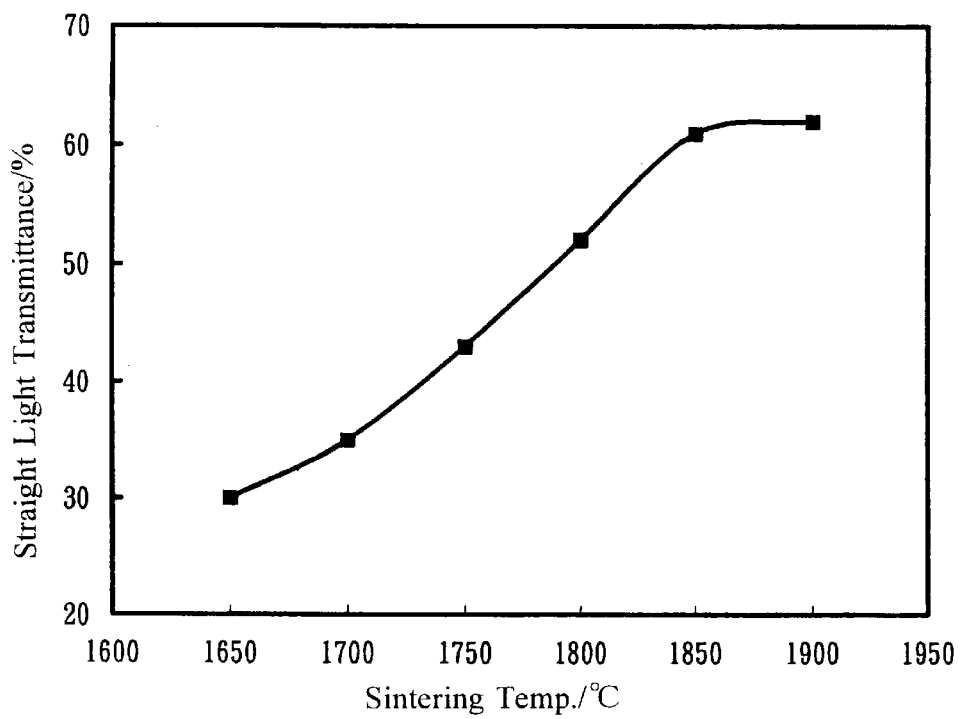
FIG. 3 is a characteristic diagram showing the relationship between sintering temperature and straight light transmittance of a translucent ceramic. Its base material YAG with addition of 10 ppm of Ca was calcinated at 1300° C. A LAG layer of 60 $\mu$m thick is provided on the internal surface of the ceramic.
Figure 4:
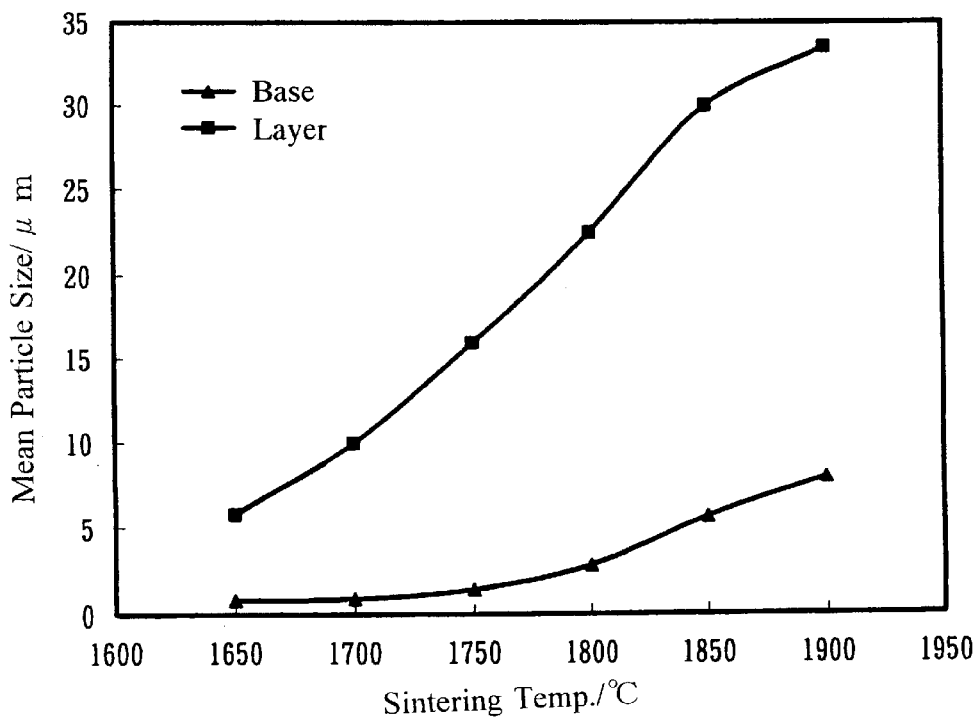
FIG. 4 is a characteristic diagram showing the relationships between mean particle size and sintering temperature of the base and the anti-corrosion layer of the translucent ceramic. Its base is YAG with addition of 10 ppm of Ca. A LAG layer of 60 μm thick is provided on the internal surface of the ceramic.

The relationship between sintering temperature and straight light transmittance of the sintered compact (measurement was made without polishing) is shown in FIG. 3. The relationships between mean particle size and sintering temperature of the base and the anti-corrosion layer are shown in FIG. 4. As the sintering temperature gets higher and in turn as the mean particle size of the anti-corrosion layer gets larger, the straight light transmittance gets higher. When the mean particle size was about 20 $\mu$m, the straight light transmittance was 50%, and when the mean particle size was 30 $\mu$m, the transmittance was 60% or over. This shows that preferably, the mean particle size of the anti-corrosion layer should be 20 $\mu$m or over, and more preferably, 30 $\mu$m or over. The straight light transmittance of a sintered compact that was sintered at 1800° C. and mirror-plane-polished on both surfaces with diamond slurry was 82%.

Embodiment 4

Figure 5:
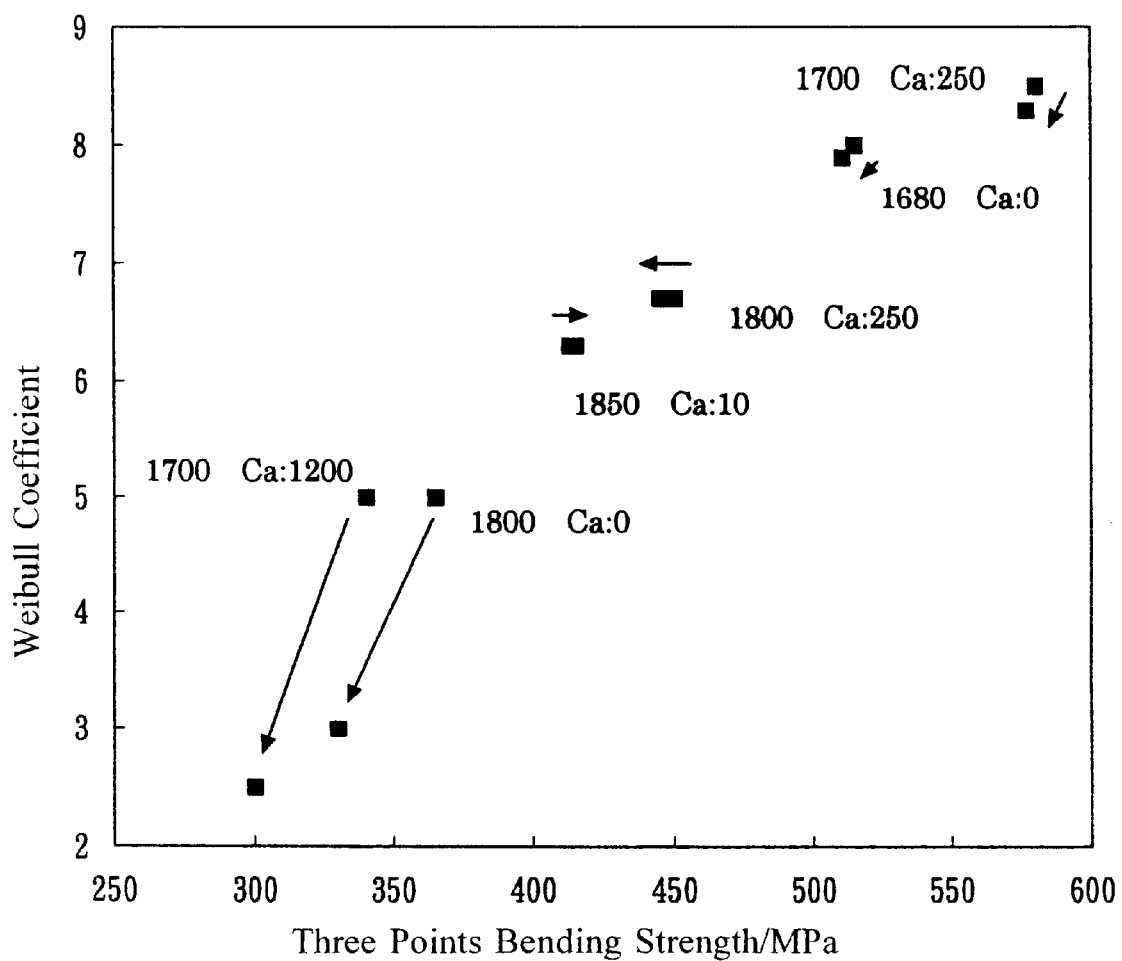
FIG. 5 is a characteristic diagram showing thermal fatigue characteristics in YAG of which Ca addition was changed from 0 to 1200 ppm in relation to sintering temperature and Ca addition.

FIG. 5 shows the results of a thermal fatigue resistance test on YAG translucent sintered compacts of which Ca additions and sintering temperatures were varied (Mg and Si were not added, and numerals such as 1800 are sintering temperatures). These sintered compacts were heated and cooled between 1200° C. and room temperature at 10 minute interval for 1000 times to test their resistance against temperature changes. The diagram shows that sintered compacts of which Weibull coefficient is 6 or over and of which mean three-points bending strength is 400 MPa or over underwent almost no drops in Weibull coefficient and can cope with temperature changes reliably. A similar test was also given to YAG sintered compacts of which an LAG layer (film thickness: 60 $\mu$m) was formed in a manner similar to Embodiment 3. The results hardly revealed any differences.

Hence we can see that the anti-corrosion layer does not affect the strength of the high pressure discharge lamp, and that resistance against thermal fatigue can be obtained by keeping Weibull coefficient of the base at 6 or over and its mean three-points bending strength at 400 MPa or over.

Embodiment 5

0.01 g of CaO (Ca content: 36 ppm) as a grain growth restrainer, 15 g of E-503 (produced by Chukyo Yushi) and 6 g of F-219 (produced by Chukyo Yushi) as deflocculants, 1.0 g of PVB-BL1 (Sekisui Chemicals) as binders, and 50 g of ethanol were added to 200 g of YAG material powder. The mixture was mixed in a ball mill using a nylon pot and nylon balls for 100 hours to prepare slurry for molding a base. In a similar manner, YbAG material powder (each of Si, Ca and Mg is 4 ppm or under) was used to prepare alcohol slurry as slurry for forming an anti-corrosion layer. The slurry for the base was poured into a gypsum mold for molding a discharge envelope and kept there for 10 $\mu$minutes. Then excess slurry was discharged, and a columnar molding of 1.2 mm thick was obtained. Next, the slurry for forming the ceramic layer was poured into the columnar molding and kept there for 10 seconds. Then the slurry was discharged. The filled gypsum mold was dried in a drier at 40° C. for 12 hours. Then the mold was removed to obtain a molding.

This molding was heated in atmosphere to 600° C. at an elevation rate of 50° C. /hour and kept at 600° C. for 12 hours to degrease it. Then the molding was sintered in a vacuum kiln at 1700° C. for 6 hours. The resulted sintered compact has an excellent translucency without any pealing of the anti-corrosion layer. Its section was mirror-plane-polished and its microstructure was examined under an optical microscope. The mean particle size of the YAG base was 0.9, $\mu$m. The mean particle size of the YbAG anti-corrosion layer was 10.5 $\mu$m, and its film thickness was 30 $\mu$m.

Embodiment 6

Figure 6:
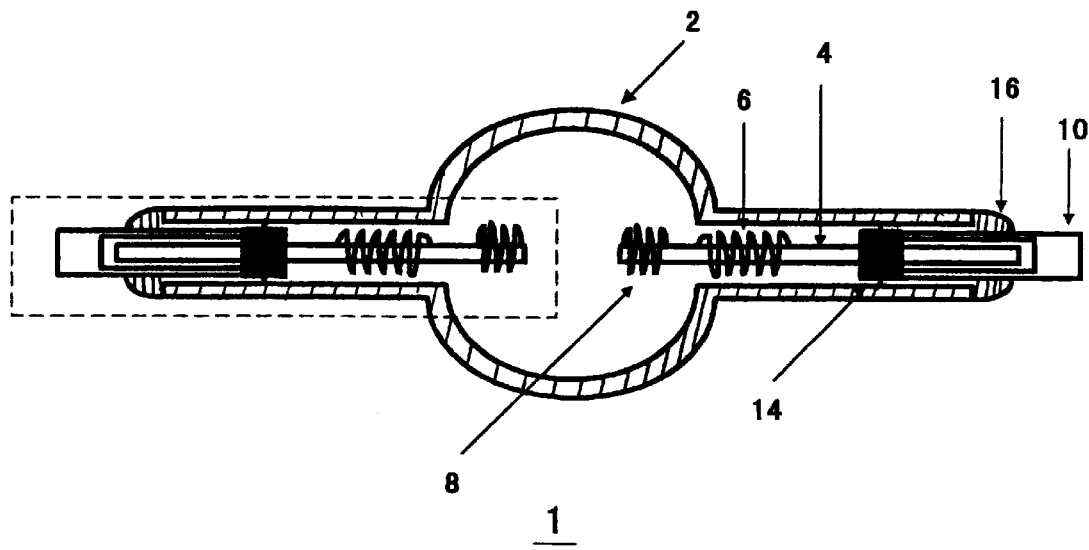
FIG. 6 is a sectional view of a high pressure discharge lamp using a translucent ceramic of an embodiment.
Figure 7:
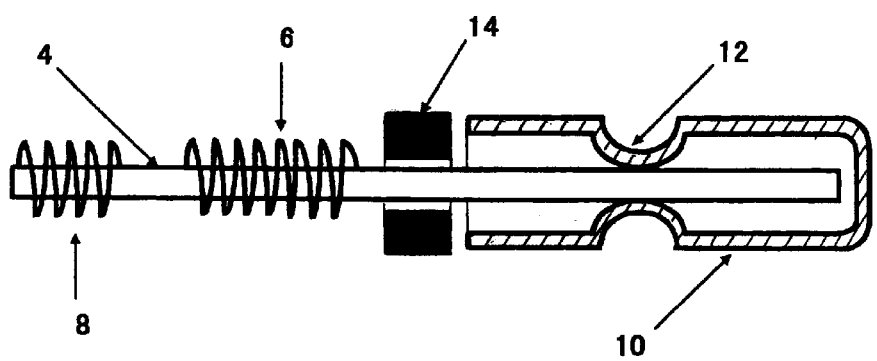
FIG. 7 is a partially enlarged sectional view of FIG. 6.

In a manner similar to Embodiment 5, a discharge envelope was produced by slip casting. The base of the envelope was YAG (mean particle size of the sintered compact was 2.8 $\mu$m and its Ca content was 36 ppm). The anti-corrosion layer was YbAG (mean particle size of the sintered compact was 15 $\mu$m and its film thickness was 30 $\mu$m, and Ca, Mg and Si were not added). Both the internal and external surfaces of the envelope were mirror-plane-polished to produce a high pressure discharge lamp shown in FIG. 6 and FIG. 7. In the high pressure discharge lamp 1, Hg, Ar and halides of Dy—Tl—Na—(Br—I) being luminescent material are sealed up inside the translucent ceramic discharge envelope 2. Both ends of the envelope 2 are hermetically sealed by fused sealing agents 16. 4 denotes a tungsten electrode, and the distance between electrodes was set at 9.2 mm. When a voltage is applied across lead pins of Nb allot 10 by a 100 W constant power alternating-current ballast, arc discharge is generated across the electrodes and the halides sealed up in the discharge envelope 2 are gasified to emit light. 8 is a tungsten coil. 12 is a caulking part for ensuring close contacts between the electrode 4 and the lead pin 10. 14 is an alumina washer for preventing reaction between the luminescent material and the sealing agent 16, etc.

Results of measurement of lumen maintenance factor and mean color rendering index (Ra) of the high pressure discharge lamp for 10,000 hours starting from the are shown in Table 2.

TABLE 2

Characteristics of the High Pressure Discharge Lamp

| Lighting hours (hr) | Lumen maintenance factor (%) | Mean color rendering index (Ra) |
|---|---|---|
| 0 | 100 | 96 |
| 100 | 99 | 96 |

TABLE 2-continued

Characteristics of the High Pressure Discharge Lamp

| Lighting hours (hr) | Lumen maintenance factor (%) | Mean color rendering index (Ra) |
|---|---|---|
| 500 | 97 | 94 |
| 1000 | 96 | 92 |
| 2500 | 93 | 90 |
| 5000 | 92 | 88 |
| 10000 | 91 | 85 |

The high pressure discharge lamp of the embodiment maintained 96% of lumen after 1000 hours of lighting. The discharge envelope and the luminescent material hardly show whitely turbid changes after 10,000 hours of lighting.

A YAG discharge envelope (mean particle size: 2.8 $\mu$m) having no YbAG anti-corrosion layer on the internal surface thereof was evaluated similarly. The discharge envelope started to get whitely turbid due to reaction with the luminescent material after about 20 hours of lighting. After 300 hours, the envelope was opaque.

Embodiment 7

Figure 8:
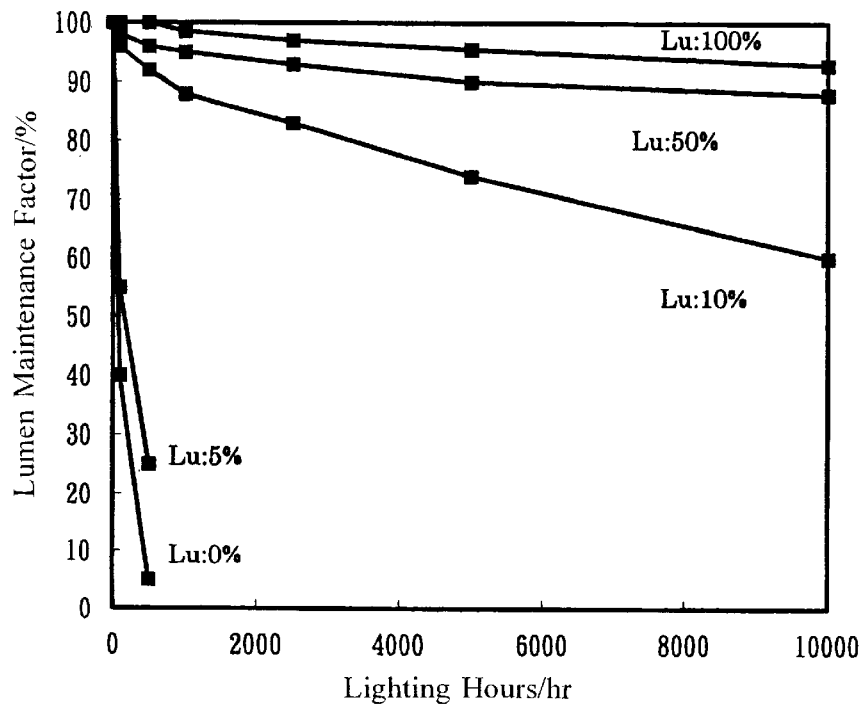
FIG. 8 is a characteristic diagram showing the relationship between lighting hours and lumen maintenance factor of a YAG high pressure discharge lamp (luminescent material: Dy-Tl-Na-(Br-I)). Y of the YAG was partially substituted with Lu and it was sintered in vacuum at 1700° C.

In a manner similar to Embodiment 1, various kinds of material powder in which the mixing ratio of Y and Lu being the constituent rare earth elements of garnet was changed were prepared. These kinds of powder were used to produce discharge envelopes (both the internal and external surfaces were mirror-plane-polished; Ca, Mg and Si are all 4 ppm or under; no anti-corrosion layer) in a manner similar to Embodiment 5. Changes in lumen maintenance factor due to varied compositions of rare earth elements are shown in FIG. 8. We can see that when 10 wt % or over of the constituent rare earth elements is Lu, the reaction with the luminescent elements is restrained significantly. Similar results were obtained for Tm and Yb as well.

Embodiment 8

In a manner similar to Embodiment 6, a sintered compact of an approximately columnar YAG base (Ca, Mg and Si are all 4 ppm or under) was produced, and both the internal and external surfaces of the sintered compact were mirror-plane-polished. Diethanolamine was mixed with some metal acetic anhydride salts at a ratio of metal/diethanolamine=1/1 and these mixtures were soluble in alcohol to prepare some specimens. These specimens were mixed at a ratio of Tm/Al=3/5 and turned into a mixed alcoholic solution (metal concentration: 0.5%). With a syringe, the solution was injected into the inside of the sintered compact from below, then the solution was quickly drained at a rate of 20 mm/minute. In this way, the internal surface of the base was coated. After coating, the base was dried in a drier at 100° C. for 30 $\mu$minutes. Then the base was heat-treated in atmosphere at 500° C. for ten minutes to bake the anti-corrosion layer onto the base. This procedure was repeated three times. Then to stabilize the crystallinity of the anti-corrosion layer, the sintered compact was heat-treated at 1200° C. for 30 minutes. As a result, an anti-corrosion layer of about 0.5 $\mu$m thick was produced. The anti-corrosion layer was free of factors that lower the straight light transmittance except the intrinsic absorption of TAG, and there were no peeling of the anti-corrosion layer from the base.

In this way, a discharge envelope with a ceramic thin layer coated on its internal surface was produced. Like Embodiment 6, a high pressure discharge lamp was produced from the envelope. Results of measurement of lumen maintenance factor for 5000 hours from the initial turning-on of the lamp are shown in Table 3.

TABLE 3

Secular Changes of Lumen Maintenance Factor

| Lighting hours (hr) | 0 | 100 | 500 | 1000 | 2500 | 5000 |
|---|---|---|---|---|---|---|
| Lumen maintenance factor (%) | 100 | 99 | 96 | 95 | 93 | 92 |

An discharge envelope comprising a base only without any TAG anti-corrosion layer was used to produce a similar high pressure discharge lamp. Its lumen maintenance factor was 40% after 100 hours of lighting.

Embodiment 9

Figure 9:
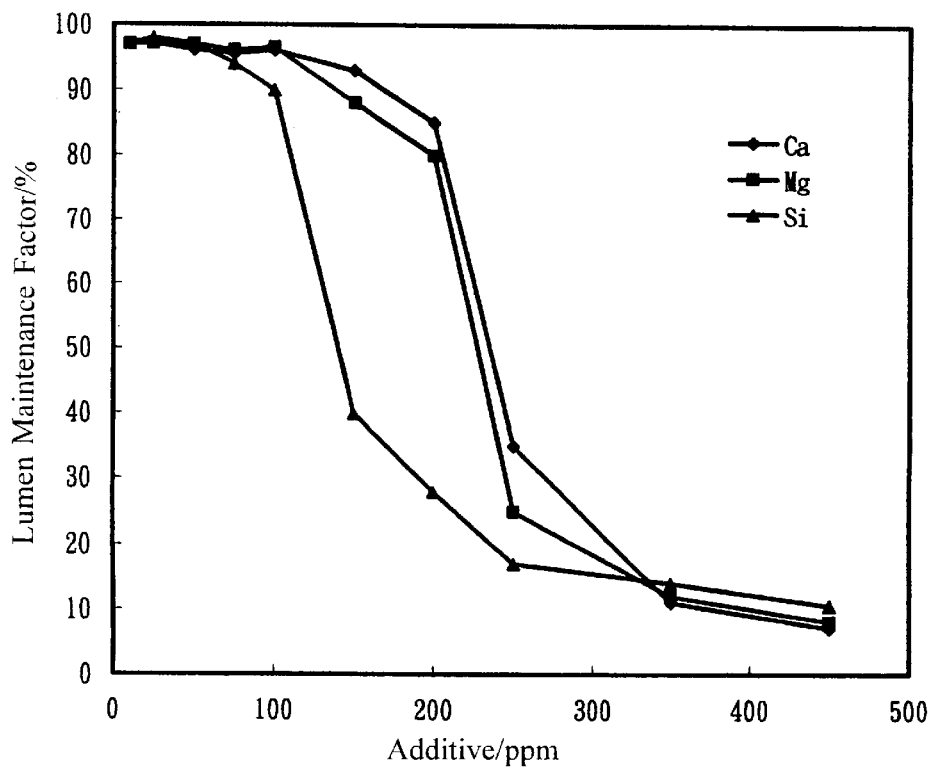
FIG. 9 is a characteristic diagram showing the effects of Ca, Mg and Si on lumen maintenance factor in a TAG high pressure discharge lamp (luminescent material: Dy-Tl-Na-(Br-I)) that was sintered in vacuum at 1700° C.

Ca, Mg and Si were added to a TAG material powder (Ca: 4 ppm; Mg: 0.5 ppm; Si: 3 ppm) to produce approximately columnar translucent ceramic discharge envelopes in a way similar to Embodiment 5. These discharge envelopes were used to produce high pressure discharge lamps. These lamps are not provided with any anti-corrosion layer. Results of a test to evaluate the lumen maintenance factors of the lamps after 500 hours of lighting are shown in FIG. 9. The drop in lumen maintenance factor was caused by getting whitely turbid of the envelope. Getting whitely turbid is notable when the content of Si and Ca or Mg is large. On the basis of these results, to produce a good discharge envelope that hardly gets whitely turbid, the content of Si should be kept not more than 100 ppm and the total content of Ca and Mg should be kept not more than 200 ppm. More preferably, the content of Si should be kept not more than 60 ppm and the total content of Ca and Mg should be kept not more than 100 ppm.

Embodiment 10

In a way similar to Embodiment 6, a variety of rare earth element garnet layers (Ca, Mg and Si are not added) were coated on the internal surfaces of Y3Al5O12 discharge envelope bases (ca: 36 ppm) to produce high pressure discharge lamps. Then the reactivity between the layer materials and luminescent materials was evaluated. The results are shown in Table 4. Lamps of which discharge envelop got whitely turbid after 100 hours of lighting are marked with X. Lamps of which envelope did not get whitely turbid are marked with ○. The luminescent materials are triiodides of rare earth elements.

What is claimed is:

1. A high pressure discharge lamp envelope comprising a tubular rare earth element aluminum garnet ceramic, wherein said tubular rare earth element aluminum garnet ceramic comprises
    constituent rare earth elements including at least one of Tm, Yb or Lu, wherein the total content of Tm, Yb and Lu is from 10 to 50 μmol % of said constituent rare earth elements,
    Si, wherein the content of Si in said ceramic is from 0 to 100 wt ppm in metal reduction, and
    Ca and Mg, wherein the total content of Ca and Mg in said ceramic is from 0 to 200 wt ppm in metal reduction.

2. A high pressure discharge lamp envelope of claim 1, wherein the mean particle size of said tubular rare earth element aluminum garnet ceramic is from 1 to 20 μm.

3. A high pressure discharge lamp envelope of claim 1, wherein said tubular rare earth element aluminum garnet ceramic has a mean three-point bending strength of at least 400 MPa and a Weibull coefficient of at least 6.

4. A high pressure discharge lamp envelope comprising
    a tubular base comprising a first rare earth element aluminum garnet ceramic, and having an internal surface and an external surface, and
    an anti-corrosion layer comprising a second rare earth element aluminum garnet ceramic, wherein said second rare earth element aluminum garnet ceramic comprises at least one of Tm, Yb and Lu as a constituent rare earth element,
    Si from 0 to 100 wt ppm in metal reduction, and Ca and Mg, wherein the total content of Ca and Mg is from 0 to 200 wt ppm in metal reduction,
wherein said anti-corrosion layer is on the internal surface of said tubular base.

5. A high pressure discharge lamp envelope of claim 4, wherein said first rare earth element aluminum garnet ceramic of said tubular base has Si at no higher than 4 ppm in metal reduction, and Ca and Mg with a total Ca and Mg content of from 5 to 1000 wt ppm in metal reduction, wherein said first rare earth element aluminum garnet ceramic of said tubular base has a mean particle size of from 1 to 15 μm.

6. A high pressure discharge lamp envelope of claim 4, wherein said tubular base has a mean three-points bending strength of at least 400 MPa and a Weibull coefficient of at least 6.

7. A high pressure discharge lamp envelope of claim 5, wherein said anti-corrosion layer has
    a mean particle size of at least 20 μm,

TABLE 4

Reactivity between Layer Materials and Luminescent Materials

| Layer material | Reacting material | | | | | | | | | | | | |
|---|---|---|---|---|---|---|---|---|---|---|---|---|---|
| | Ce | Pr | Nd | Sm | Gd | Tb | Dy | Ho | Er | Tm | Yb | Lu | Sc |
| Y3Al5O12 | ○ | ○ | ○ | ○ | ○ | X | X | X | X | X | X | X | X |
| Th3Al5O12 | ○ | ○ | ○ | ○ | ○ | ○ | X | X | X | X | X | X | X |
| Dy3Al5O12 | ○ | ○ | ○ | ○ | ○ | ○ | ○ | X | X | X | X | X | X |
| Ho3Al5O12 | ○ | ○ | ○ | ○ | ○ | ○ | ○ | ○ | X | X | X | X | X |
| Er3Al5O12 | ○ | ○ | ○ | ○ | ○ | ○ | ○ | ○ | ○ | X | X | X | X |
| Tm3Al5O12 | ○ | ○ | ○ | ○ | ○ | ○ | ○ | ○ | ○ | ○ | ○ | ○ | ○ |
| Yb3Al5O12 | ○ | ○ | ○ | ○ | ○ | ○ | ○ | ○ | ○ | ○ | ○ | ○ | ○ |
| Lu3Al5O12 | ○ | ○ | ○ | ○ | ○ | ○ | ○ | ○ | ○ | ○ | ○ | ○ | ○ |

Si at 0 to 60 wt ppm in metal reduction, and the total content of Ca and Mg of from 0 to 100 wt ppm in metal reduction.

8. A high pressure discharge lamp envelope of claim 7, wherein only the external surface of the base of said corrosion resistant ceramic is polished.

9. A tubular high pressure discharge lamp envelope comprising a tube of $Yb_3Al_5O_{12}$ ceramic having a mean particle size of 1 to 20 μm;

Si at 0 to 100 wt ppm in metal reduction; and

Ca and Mg, wherein the total content of Ca and Mg is from 0 to 200 wt ppm in metal reduction.

10. A high pressure discharge lamp envelope according to claim 9, wherein said $Yb_3Al_5O_{12}$ ceramic has a mean three-point bending strength of at least 400 MPa and a Weibull coefficient of at least 6.

11. A high pressure discharge lamp envelope according to claim 10, wherein said tube of $Yb_3Al_5O_{12}$ has a mean particle size of 1 to 10 μm;

Si at 0 to 4 wt ppm in metal reduction; and

Ca and Mg, wherein the total content of Ca and Mg is from 0 to 60 wt ppm in metal reduction.

* * * * *